Figure 1:
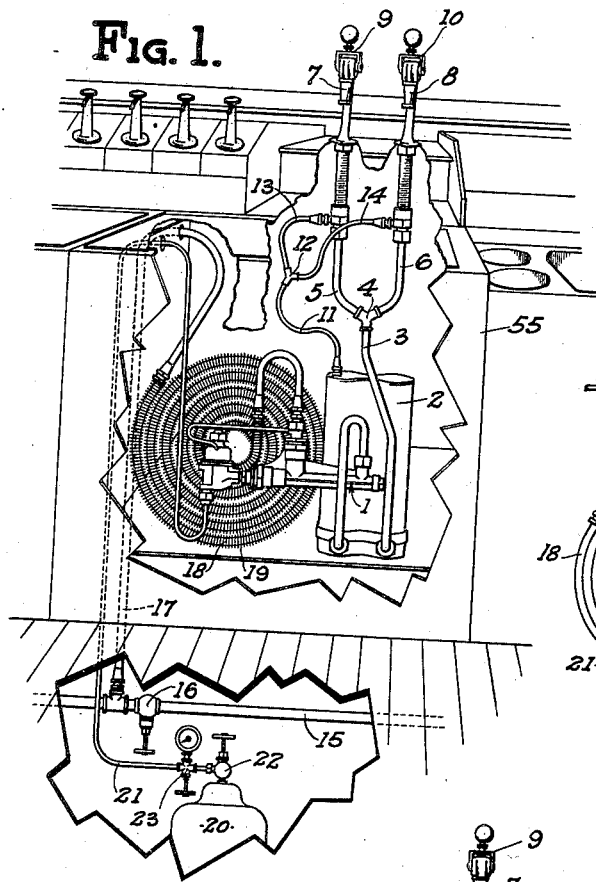

May 21, 1940.    C. P. DEIBEL    2,201,429
CARBONATING APPARATUS AND COOLING UNIT
Filed Jan. 7, 1939    2 Sheets-Sheet 1

INVENTOR.
Cyril P. Deibel
BY Hull Broch & Walsh
ATTORNEYS.

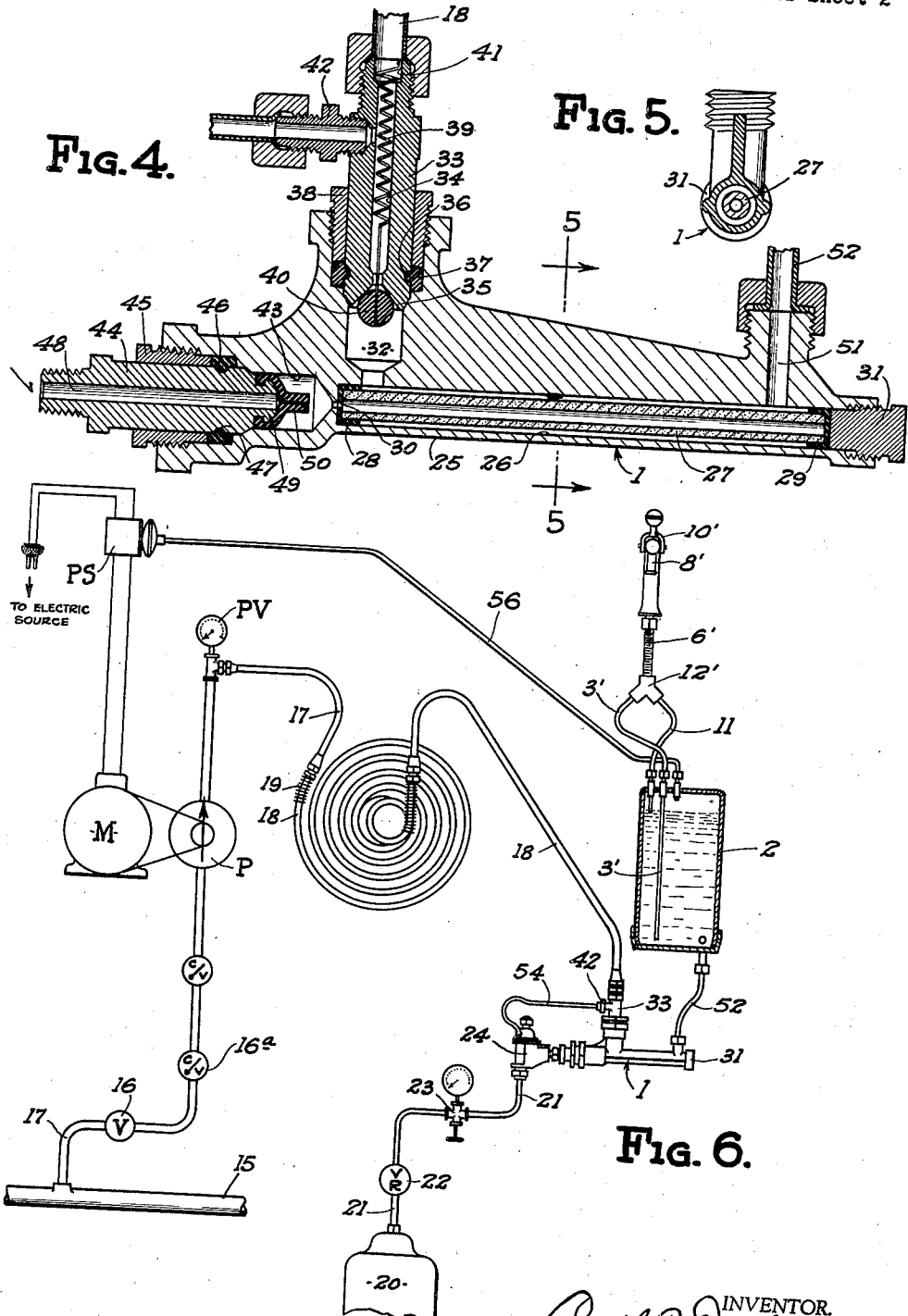

Patented May 21, 1940

2,201,429

UNITED STATES PATENT OFFICE 2,201,429

CARBONATING APPARATUS AND COOLING UNIT

Cyril P. Deibel, Lakewood, Ohio

Application January 7, 1939, Serial No. 249,788

3 Claims. (Cl. 225—28)

This invention relates to a carbonating apparatus and cooling unit therefor which is particularly adapted for the preparation and maintenance of chilled carbonated water at soda fountains, bars or the like; and which is so designed that it occupies a very small space and may be positioned within a cooling chamber located in close proximity to the faucet from which the carbonated water is to be dispensed.

One of the main objects of the invention is to provide a carbonating device and storage vessel which will occupy very little space and which may be located in a cooling chamber disposed adjacent the draft arms from which the carbonating water is to be dispensed. Carbonated water should be dispensed with the highest possible gas content and at as low temperature as possible. The carbonator, as well as the water delivered to the carbonator, should be kept as cool as possible, as the amount of carbon dioxide gas that the water will absorb and retain is almost inversely proportional to the temperature of the water. The carbonator should be located as near as possible to the draft arms so that the carbonated water being dispensed will not have to flow through long pipes which are not sufficiently cooled. Adequate storage capacity for carbonated water should be provided to insure the carbonated water remaining in the cooler for a sufficiently long period to become properly chilled. When the storage vessel or cooler for carbonated water is not maintained sufficiently cool there is a tendency for a relatively large amount of carbon dioxide gas to free itself from the water and to accumulate in the top of the vessel and prevent the storage vessel from becoming filled or substantially filled with carbonated water of the desired gas content.

One of the main objects of this invention is to provide a unit including a carbonator and storage vessel for the carbonated water in which means are provided for venting the storage vessel so as to prevent any excess accumulation of free gas.

Another object of the invention is to provide a carbonator and cooler which is so shaped and designed that it may be placed in a cooling compartment in any one of several positions depending upon the shape of the cooling compartment, the entire unit being so designed that it will occupy as little space as possible.

A further object of the invention is to provide a carbonator and cooling unit of the character described which is of such size and capacity that the carbonator and cooling unit may both be located in the cooling compartment usually found at a soda fountain or bar.

Another object of the invention is to provide a carbonator and storage vessel for carbonated water which is adapted to carbonate and to store a sufficient quantity of water to supply the usual demand and which will operate automatically and continuously to maintain the necessary supply of cooled carbonated water of the desired carbon dioxide content.

A still further object of the invention is to provide a carbonator unit and storage and cooling vessel for carbonated water which comprises few parts which are well adapted for production at comparatively low cost and which will function properly under varying conditions of water pressure, the unit being provided with a motor operated pump which is automatically set into operation when the water pressure falls below a predetermined minimum.

The cooling unit referred to and disclosed herein is commonly called a "barrel cooler" and serves as a combination equalizing, cooling and storage vessel. A small amount of free gas accumulates in the top of the cooling chamber and under normal conditions the water remains in the cooler for a sufficient period of time to be further cooled and to absorb an additional amount of this accumulated gas. However, the top of the cooler is connected with the draft arm, or the connections leading to the draft arm, so that this accumulated excess gas is vented through the draft arm at each dispensing operation. The vent connection with the draft arm is through a very small restricted opening so that the gas is mixed with the water being discharged. The particular means for venting the excess gas is applicable to any unit or barrel cooler without regard to the particular form of carbonator used. It is necessary to maintain a small quantity of free gas in the top of the cooler but it is also necessary to vent the cooler in order to prevent an excess accumulation of free gas therein sufficient to prevent the cooler from filling and refilling to the desired level. In my improved unit the regulator valve has a fine and accurate adjustment and is very sensitive and may be regulated so as to admit any small additional quantity of gas through the carbonator which is not absorbed by the water passing through the carbonator but accumulates in the upper part of the cooling chamber where the water absorbs more gas. One of the objects of this invention is to provide a combination equalizing, cooling and storage vessel for maintaining and dispensing carbonated water having the aforementioned distinguishing characteristics and advantages.

Figure 2:
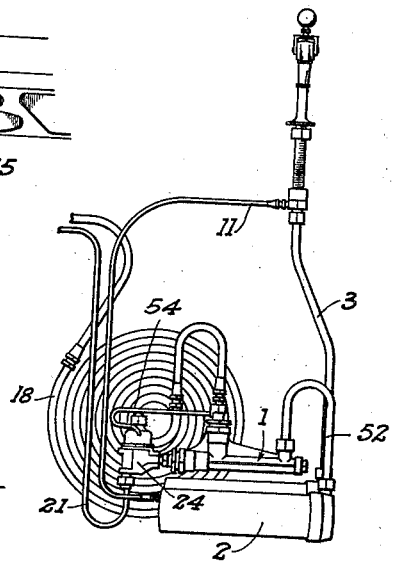
Figure 3:
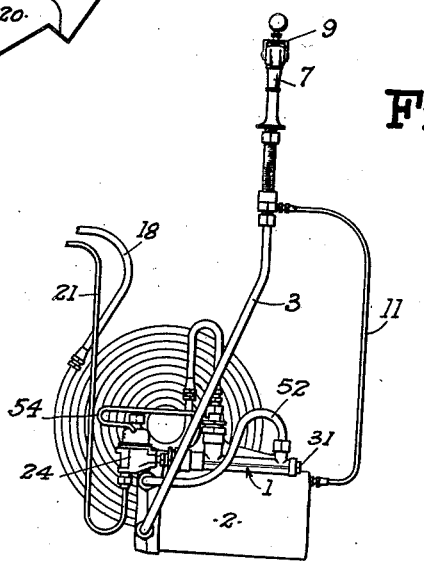

Further and more limited objects of the invention will appear as the description proceeds and by reference to the accompanying drawings in which Fig. 1 is a view of my improved carbonator unit as it will appear when applied to the bar or soda fountain; Fig. 2 is a detail view in elevation showing the essential parts of the unit but omitting the pump; Fig. 3 is a view similar to Fig. 2 with the storage vessel disposed in a different position; Fig. 4 is a detail sectional view of the carbonator proper; Fig. 5 is a vertical sectional view on the line 5—5 of Fig. 4; and Fig. 6 is a diagrammatic view of a somewhat modified form of my invention showing the arrangement of parts including an automatically controlled pump for delivering water to the carbonator at the desired pressure.

Referring now to the drawings, Figs. 1–5 inclusive, my improved carbonator unit consists essentially of a carbonator 1 which delivers into a storage vessel or cooler 2 from which leads a discharge pipe 3 which is connected with a union 4 from which lead a pair of dispensing pipes 5 and 6 which connect with draft arms 7 and 8 which are controlled by valves 9 and 10. Leading from the cooling chamber 2 is a vent pipe 11 which connects with a Y connection 12 from which lead branch pipes 13 and 14 which connect with the pipes 5 and 6, respectively. The pipe 14 serves to vent through the dispensing outlets any excess free gas which may accumulate in the upper end of the cooling vessel 2. The reference character 15 designates the water supply line which is usually connected with a city water main and which is provided with a manually controlled valve 16. Leading from the pipe 15 is a pipe 17 which connects with a cooling coil 18 having a plurality of cooling fins 19 arranged thereon. The delivery end of the cooling coil 18 is connected with the carbonator 1. The reference character 20 designates a gas drum which contains a supply of carbon dioxide gas and from which leads a pipe 21 controlled by a manually operable valve 22. Disposed in the pipe 21 is a gas regulator valve 23 which controls the pressure at which the gas is delivered through the pipe 21. The delivery end of the pipe 21 is connected with a gas regulator valve 24 which in turn delivers into the carbonator. The gas regulator valve 24 serves to automatically control and regulate the gas pressure with respect to the water pressure for any usual fluctuations in the water pressure.

The carbonator 1 is shown in detail in Figs. 4 and 5 and preferably consists essentially of a die casting 25 which is shaped in section as shown most clearly in Figs. 4 and 5. The carbonator 1 has a bore or passageway 26 which is preferably circular in section and arranged therein is a hollow porous stone 27 which is preferably tubular in shape. Disposed at opposite ends of the stone are rubber mountings 28 and 29 which fit over the ends of the stone, the mounting 28 having an opening 30 therein leading into the center of the porous stone. The stone is held in place by a plug 31 threadedly secured in the open end of the bore or passageway 26. The carbonator is also provided with a cored passageway or bore 32 in which is secured a fitting 33 having an axial bore 34 leading therethrough and provided at its inner end with a tapered valve seat 35. The fitting 33 is also provided with an annular groove 36 adjacent the inner end thereof and fitting over this end of the fitting is a rubber sleeve 37. The fitting 33 is secured in place by a threaded sleeve 38 which abuts against the rubber sleeve 37. When the sleeve 38 is tightened the rubber sleeve 37 is compressed so as to force a part thereof into the annular groove 36 so that the fitting is firmly and securely held in place. Such a fitting is known to the trade as a "Garlock" fitting. Disposed within the bore 34 is a coil spring 39 which is preferably formed of stainless steel and which has secured to the inner end thereof a ball valve 40 preferably formed of rubber and which seats on the tapered valve seat 35. The outer end of the spring 33 is positioned within a shouldered recess 41 provided in the outer end of the fitting and the inner end of the spring extends through the ball check valve 40 and is bent over as shown most clearly in Fig. 4 so that the ball valve is constantly urged toward its seat by the spring and is opened by the pressure of water entering through the fitting. The cold water pipe 18 is connected with the outer end of the fitting. Threadedly secured in one side of the fitting 33 is a connection 42 the purpose of which will hereinafter appear. The carbonator is also provided with a cored passageway or bore 43 into which is secured a fitting 44 which is held in place by means of the metal sleeve 45 and rubber sleeve 46 which engages in an annular groove 47 provided in the fitting 44 in the manner described in connection with the fitting 33. The fitting 44 is also provided with an axially disposed bore or passageway 48 through which gas is delivered from the gas regulator valve. The inner end of the fitting 44 is provided with a head portion 49 which receives thereover a rubber check valve 50 which is of well known construction and which is known to the trade as a "Thomas" check valve. The carbonator is also provided with a bore or passageway 51 to which is connected a carbonated water delivery pipe 52 which delivers into the lower end of the cooling vessel 2.

The gas regulator valve 24 is of the type disclosed in the Welker & Vaughn Patent No. 2,072,350 except that the flow of gas therethrough is controlled by a needle valve which has a very fine and accurate adjustment. The delivery outlet from the gas regulator valve is connected with the fitting 44 of the carbonator and the pipe 54 connects one side of the regulator valve with the connection 42 leading into the carbonator, so that the gas pressure is regulated with respect to the water pressure. The regulator valve is so adjusted that the gas pressure is slightly in excess of the water pressure so that the gas may be forced through the porous stone as the water flows over the stone.

When the carbonator and cooling unit are to be installed in a fountain, bar or the like, the cooling coil 18, the carbonator 1, and the storage vessel 2 are arranged within the cooling compartment 55, as shown in Fig. 1 in close proximity to the draft arms. The compartment 55 is cooled either by ice or by a refrigerating apparatus.

In the operation of this unit the cold water is delivered through the cooling coil and through the carbonator and over the porous stone 27 in a thin generally annular sheet. At the same time gas is delivered through the porous stone. The water is cooled by flowing through the cooling tube and is maintained at as low a temperature as practical. The carbonated water is delivered from the carbonator through the pipe 52 into the bottom of the cooling vessel 2. The cooling vessel 2 is preferably of small capacity and contains only a sufficient amount of carbonated water to fill several glasses. The carbonated water is dispensed from the cooling vessel 2 through the pipe 3 and the draft arms 7 or 8. Any excess free gas which may accumulate in the cooling chamber 2 is vented through the draft arms through the pipe 11 which is connected with both draft arms. The intake end of the pipe 11 projects a slight distance into the vessel 2 so that a small head of gas is always maintained in the vessel 2. When the level of carbonated water in the vessel 2 falls below the inlet end of the pipe 11, any free gas will be vented through the draft arms. The cooling chamber may be positioned within the cooling compartment 55 in any one of the three positions shown in Figs. 1, 2 and 3, it being only necessary to position the cooling vessel so that the vent pipe 11 will be uppermost or at the top.

The entire unit is small and compact and consists of relatively few parts which are adapted to be arranged in a cooler compartment immediately adjacent the draft arm for dispensing carbonated water. All of the parts with which carbonated water comes into contact are preferably formed of block tin or are tinned so that the carbonated water or carbonic acid gas will not react upon the metal. The pressure of the gas is automatically regulated with respect to the water pressure so that a sufficient quantity of carbonated water of the desired carbon dioxide content may be maintained at the desired temperature.

In Fig. 6 I have somewhat diagrammatically disclosed a slightly modified form of my invention which is identical with the disclosures in Figs. 1 to 5 inclusive except that I make use of a pump which is automatically controlled so as to deliver the water to the carbonator at the desired pressure. A pump is not necessary unless there is a great fluctuation in water main pressure. The carbonator and storage vessel for carbonated water are the same apparatus as disclosed in Figs. 1 to 5 inclusive; and the corresponding parts in Fig. 6 are given the same reference characters. In this form of apparatus the water is delivered from the water main through a pipe 17 and through a check valve 16a and thence into the inlet side of a pump P which is driven by means of an electric motor M. A suitable pressure valve PV may be disposed in the water supply line on the discharge side of the pump for indicating the pressure at which the water is being delivered to the carbonator. The motor is controlled by means of a pressure switch PS one side of which is connected to a suitable source of current and the other side of which is connected to the motor terminals. The pressure side of the switch is connected with the top of the cooling vessel 2 by means of a pipe 56. The carbonated water is discharged from the cooling vessel 2 by means of a pipe 3' leading from a point adjacent the bottom of the cooling vessel and connecting with a Y 12' to which the vent pipe 11 is also connected. A pipe 6' leads from the Y 12' to the draft arm 8' which is controlled by a valve 10'. In other respects, this form of the invention is identical with the form of the invention disclosed in Figs. 1 to 5 inclusive. The operation of this modified unit is the same as that described in connection with Figs. 1 to 5 inclusive, except that water is forcibly delivered through the water supply pipe line 17 by means of the pump P. When the gas pressure within the upper portion of the storage vessel 2 falls below a predetermined point, the pressure switch is actuated to start the motor and to operate the pump. When the vessel 2 becomes substantially filled with liquid, the pressure switch is subjected to an increased pressure which cuts off the supply of current to the motor which stops the pump. The pump and motor may be located as desired but the pressure switch should be disposed above the top of the cooling vessel 2.

It will now be clear that I have provided a carbonating apparatus and storage vessel for carbonated water which will accomplish the objects of the invention as hereinbefore stated. It is to be understood that the embodiment of the invention disclosed herein is merely illustrative and is not to be considered in a limiting sense as various changes may be made in the details of construction and arrangement of parts without departing from the spirit of my invention. The invention is therefore limited only in accordance with the scope of the appended claims.

Having thus described my invention, what I claim is:

1. A carbonator unit of the character described for producing, storing and cooling carbonated water comprising a carbonator, a storage and cooling vessel disposed in open communication with said carbonator, a discharge pipe leading from said vessel, a draft arm connected with said discharge pipe, a vent pipe having its inlet end disposed within said vessel at a point slightly below the normal level of liquid therein and having its outlet end connected with said discharge pipe and having a restricted delivery opening whereby to permit excess free gas to be slowly vented through said draft arm.

2. A carbonator unit of the character described for producing, storing and cooling carbonated water comprising a carbonator, a storage and cooling vessel disposed in open communication with said carbonator, a discharge pipe leading from a point adjacent the bottom of said vessel, a union to which said discharge pipe is connected, a draft arm connected with said union, a vent pipe having its inlet end disposed slightly below the normal liquid level in said vessel and its outlet end connected with said union and having a restricted delivery opening whereby to permit excess free gas within said storage vessel to be vented through said draft arm.

3. In an apparatus for producing, storing and cooling carbonated water, the combination of a storage and cooling vessel, a carbonator intermittently supplying carbonated water to said vessel so as to maintain a substantially constant volume of carbonated water therewithin, a discharge pipe leading from a point adjacent the bottom of said storage vessel, a union to which said discharge pipe is connected, a draft arm connected with said union, a vent pipe having its inlet end disposed slightly below the normal level of liquid within said vessel and having its delivery end connected with said union and provided with a restricted delivery opening whereby to permit excess free gas within said vessel to escape through said draft arm at a very slow rate.

CYRIL P. DEIBEL.